United States Patent [19]

Moran

[11] Patent Number: 4,913,021

[45] Date of Patent: * Apr. 3, 1990

[54] HIGH-PRECISION PUNCH AND DIE APPARATUS

[75] Inventor: Paul W. T. Moran, Fairport, N.Y.

[73] Assignee: Eastman Kodak Company, Rochester, N.Y.

[*] Notice: The portion of the term of this patent subsequent to Apr. 3, 2007 has been disclaimed.

[21] Appl. No.: 277,584

[22] Filed: Nov. 29, 1988

[51] Int. Cl.$^4$ .......................... B26D 3/14; B26F 1/12
[52] U.S. Cl. ........................................ 83/641; 83/685; 83/686; 83/693; 83/700; 83/824; 83/917; 184/5; 384/12
[58] Field of Search ...................... 184/5, 100; 384/12; 83/13, 55, 169, 613, 639, 821, 823, 824, 684, 685, 686, 690, 692, 693, 916, 917, 700

[56] References Cited

U.S. PATENT DOCUMENTS

| | | | |
|---|---|---|---|
| 2,364,334 | 12/1944 | Wold | 83/916 |
| 2,678,098 | 5/1954 | Morris | 83/693 |
| 3,405,583 | 10/1968 | Herzog | 83/693 |
| 3,410,168 | 11/1968 | Feitshans | 83/693 |
| 3,465,633 | 9/1969 | Reynolds et al. | 83/693 |
| 3,682,033 | 8/1972 | Lanahan | 83/693 X |
| 3,707,104 | 12/1972 | Congrove | 83/513 |
| 3,903,993 | 9/1975 | Vorrhees et al. | 184/5 |
| 4,234,175 | 11/1980 | Sato et al. | 269/73 |
| 4,448,460 | 5/1984 | Yamamoto | 308/5 R |
| 4,459,886 | 7/1984 | Belzil | 83/178 |
| 4,606,587 | 8/1986 | Thompson | 384/12 |
| 4,630,942 | 12/1986 | Tsumaki et al. | 384/8 |
| 4,633,743 | 1/1987 | Ichikawa | 83/693 X |
| 4,648,723 | 3/1987 | Sugiyama et al. | 384/9 |

Primary Examiner—Hien H. Phan
Attorney, Agent, or Firm—William C. Dixon

[57] ABSTRACT

A high-precision punch and die apparatus having a stationary frame; a punch movable relative to the frame, the punch including integral pneumostatic bearing surfaces and at least one cutting edge; and a die adjustably mounted to the frame to receive the punch therethrough, the die including at least one cutting edge coactable with the cutting edge(s) on the punch. A pair of pneumostatic bearings are provided to constrain and guide movement of the punch through the die, each bearing having a segmented journal that includes a plurality of journal segments formed with a pneumostatic bearing surface, the journal segments being adjustably mounted, relative to the frame, to receive the punch therebetween so that the bearing surface on each journal segment is in closely spaced relation to an opposing one of the bearing surfaces on the punch. Also provided are means for controllably supplying a pressurized gas to the bearing surface on each journal segment, to facilitate constraining and guiding movement of the punch through the die, and means for effecting such movement of the punch through the die so as to move the cutting edge(s) on the punch into coacting relation with the cutting edge(s) on the die.

13 Claims, 5 Drawing Sheets

HIGH-PRECISION PUNCH AND DIE APPARATUS

BACKGROUND OF THE INVENTION

1. Field of the Invention

The present invention relates generally to punch and die apparatus, and particularly to such apparatus that possesses the combined attributes of high precision and low tool wear.

2. Description of the Prior Art

The prior art is replete with disclosures of various apparatus intended to achieve precisely controlled positioning of a moving member. For example, U.S. Pat. No. 3,903,993 to Vorrhees et al. discloses a press slide which is reciprocable in a press frame. Hydrostatic bearings guide the slide as it reciprocates, and they resist any lateral deflection thereof due to an unbalanced load. For another example, U.S. Pat. No. 4,448,460 to Yamamoto discloses a hydrostatic bearing arrangement intended to achieve greater load bearing capacity and rigidity for a sliding member. Also, U.S. Pat. No. 4,606,587 to Thompson discloses a precision air slide that includes a slide ram which is movable, with the aid of air bearings, inside a relatively stationary segmented housing While such known apparatus may have sufficed for their respective purposes, there has remained a persistent need for an effective and practical way to achieve both high precision and negligible wear in punch and die apparatus.

SUMMARY OF THE INVENTION

Accordingly, a primary object of this invention has been to meet the foregoing need in such apparatus, and to do so in a totally reliable, yet practical and economical, manner. That and other objects have been achieved by the invention herein disclosed and claimed.

This invention finds utility in a high-precision punch and die apparatus comprising a stationary frame; a punch adapted for movement relative to the frame, the punch having integral pneumostatic bearing surfaces and at least one cutting edge; and a die adjustably mounted to the frame to receive the punch therethrough, the die having at least one cutting edge adapted to coact with the cutting edge(s) on the punch. A pair of pneumostatic bearings are provided to constrain and guide movement of the punch through the die, each bearing having a segmented journal that includes a plurality of journal segments formed with a pneumostatic bearing surface, the journal segments being adjustably mounted, relative to the frame, to receive the punch therebetween so that the bearing surface on each journal segment is in closely spaced relation to an opposing one of the bearing surfaces on the punch. Also provided are means for controllably supplying a pressurized gas to the bearing surface on each journal segment, to facilitate constraining and guiding movement of the punch through the die, and means for effecting such movement of the punch through the die so as to move the cutting edge(s) on the punch into coacting relation with the cutting edge(s) on the die.

This invention, and its objects and advantages, will become more apparent in the detailed description of the illustrated embodiments thereof presented hereinbelow.

BRIEF DESCRIPTION OF THE DRAWINGS

In the detailed description of the embodiments of this invention presented below, reference is made to the accompanying drawings, wherein like reference characters denote like elements, and wheein.

DESCRIPTION OF THE ILLUSTRATED EMBODIMENTS

Because certain parts of punch and die apparatus are well known, the following description is directed in particular to those elements forming, cooperating directly with, or relating to, this invention. Elements not specifically shown or described herein are selectable from those known in the relevant art.

Figure 1:
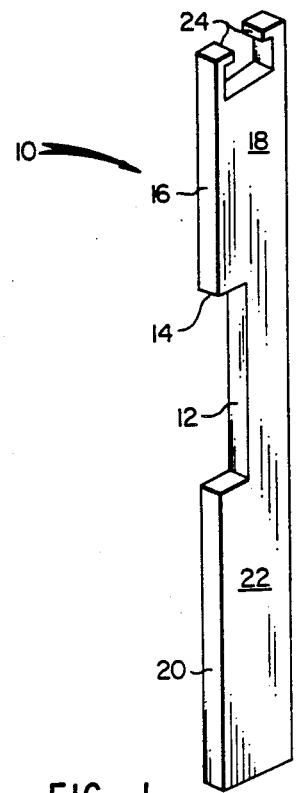
FIG. 1 is a perspective view of a punch as configured in accordance with an embodiment of this invention.

FIG. 1 illustrates a punch 10 configured in accordance with one embodiment of this invention. Punch 10 is an elongate one-piece member made of air-hardened tool steel and having a generally rectangular cross section. Punch 10 has a cut-out section 12 with a cutting edge 14 formed at the upper end thereof. Above and below cut-out section 12, on all four sides of the punch, are integral pneumostatic bearing surfaces, only four of which, 16, 18, 20, and 22, are shown. At the top end of punch 10 are a pair of lugs 24 adapted to be operatively coupled to a suitable motion-imparting means such as a pneumatic cylinder.

Figure 2:
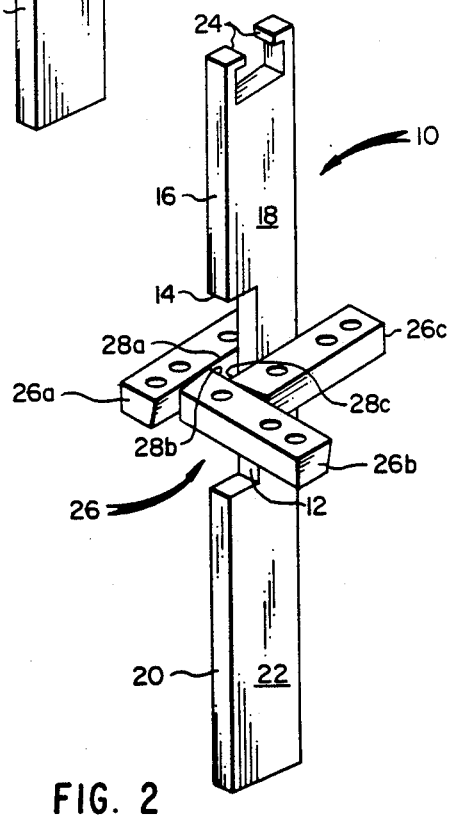
FIG. 2 is a perspective view of the punch shown in FIG. 1 together with a segmented die configured in accordance with an embodiment of this invention.

Turning now to FIG. 2, punch 10 is shown together with a segmented dye 26, which comprises three die segments 26a, 26b, and 26c having cutting edges 28a, 28b, and 28c, respectively. The die segments are clustered about a central portion of cut-out section 12 so as to position their cutting edges for proper coaction with cutting edge 14, to effect thereby a desired cutting action upon downward movement of the punch through the die. The generally U-shaped die 26 is segmented as shown so that each leg of the U individually may be machined to the precision required, sharpened, and adjustably set to achieve a "near zero" clearance with the opposing surface of punch 10. The die segments also are made from air-hardened tool steel.

Figure 3:
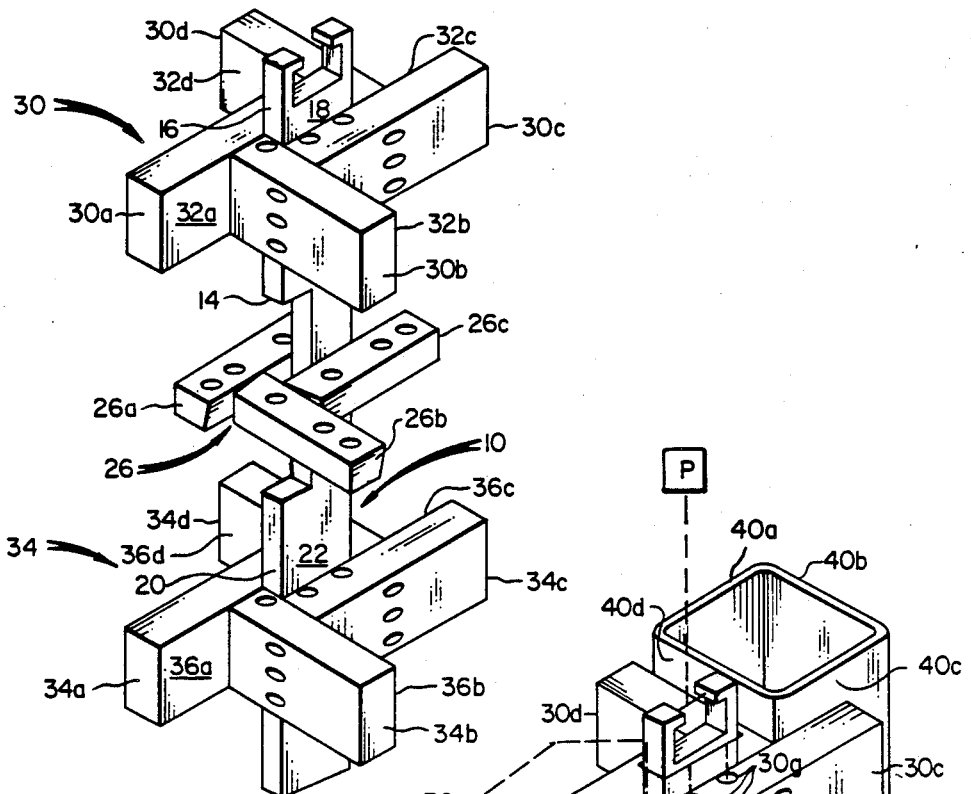
FIG. 3 is a perspective view of the punch and die shown in FIG. 2 together with a pair of pneumostatic bearings configured in accordance with an embodiment of this invention.

FIG. 3 shows the punch and die combination of FIG. 2 together with segmented upper and lower pneumostatic bearings 30 and 34. Upper bearing 30 comprises bearing segments 30a, 30b, 30c, and 30d provided with pneumostatic bearing surfaces 32a, 32b, 32c, and 32d respectively. Similarly, lower bearing 34 comprises bearing segments 34a, 34b, 34c, and 34d provided with pneumostatic bearing surfaces 36a, 36b, 36c, and 36d respectively. Both bearings 30 and 34 are positioned so that their bearing surfaces lie in close face-to-face relation to respective ones of the bearing surfaces on punch 10. For example, upper bearing surface 32b lies in close facing relation to punch bearing surface 16, while upper bearing surface 32c lies in such relation to punch surface 18. Similarly, lower bearing surfaces 36b and 36c lie in such relation to punch bearing surfaces 20 and 22 respectively.

Figure 4:
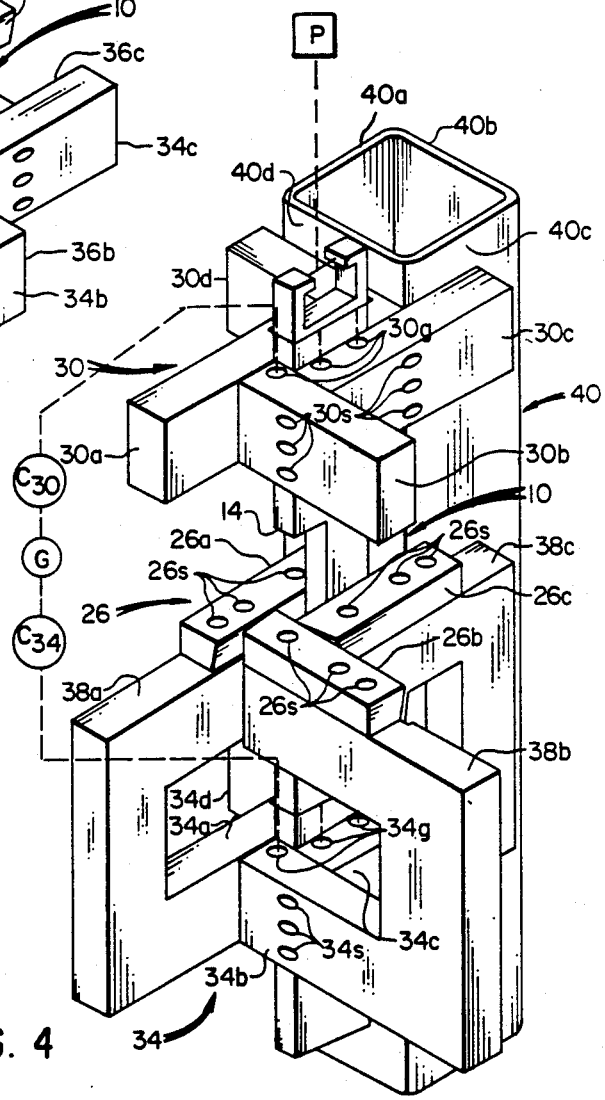
FIG. 4 is a perspective view similar to FIG. 3 but with additional structure for mounting the die and pneumostatic bearings, and with schematic depiction of respective means for pressurizing the bearings and moving the punch therethrough.

FIG. 4 illustrates the combination just described mounted to a stationary, rigid, mounting frame structure 40. In this figure, three of the lower bearing segments are shown extended in a U-shaped manner to provide corresponding integral supports for the die segments. Thus, bearing segment 34a as so extended includes a horizontal leg 38a for supporting die segment 26a. Similarly, bearing segment 34b as extended includes a horizontal leg 38b for supporting die segment 26b, and bearing segment 34c as extended includes a horizontal leg 38c for supporting die segment 26c. Each of the die segments 26a, 26b, and 26c is adjustably mounted on its respective supporting leg by mounting screws 26s in oversized mounting screw holes. The mounting frame structure 40 comprises a tubular steel structure of rectangular cross section including four mutually perpendicular walls 40a, 40b, 40c, and 40d. Upper bearing segment 30d and lower bearing segment 34d are rigidly secured to wall 40d. Similarly, upper bearing segment 30c and extended lower bearing segment 34c are rigidly secured to wall 40c. Upper bearing segment 30c also is secured to the adjacent end of upper bearing segment 30d, and lower bearing segment 34c is secured to the adjacent end of lower bearing segment 34d. Upper bearing segment 30a then is adjustably mounted to the adjacent end of upper bearing segment 30b, which is adjustably mounted to the adjacent end of upper bearing segment 30c. Similarly, lower bearing segment 34a and supporting leg 38a are adjustably mounted to the adjacent ends of lower bearing segment 34b and supporting leg 38b respectively. FIG. 4 shows the foregoing members so mounted upon structure 40 with punch 10 inserted through the openings thus provided by the air bearings and die.

Also depicted in FIG. 4 are upper bearing gas supply ports 30g and lower bearing gas supply ports 34g. Preferably, for convenience, the gas supplied through those ports to their respective bearing surfaces is air. Ports 30g and 34g are schematically shown connected through suitable control means C30 and C34 to a source G of pressurized air. Also schematically shown in this figure is a pneumatic cylinder P, operatively coupled to lugs 24 at the top end of punch 10, for effecting movement of the punch through the die as required for a desired cutting operation.

Figure 5:
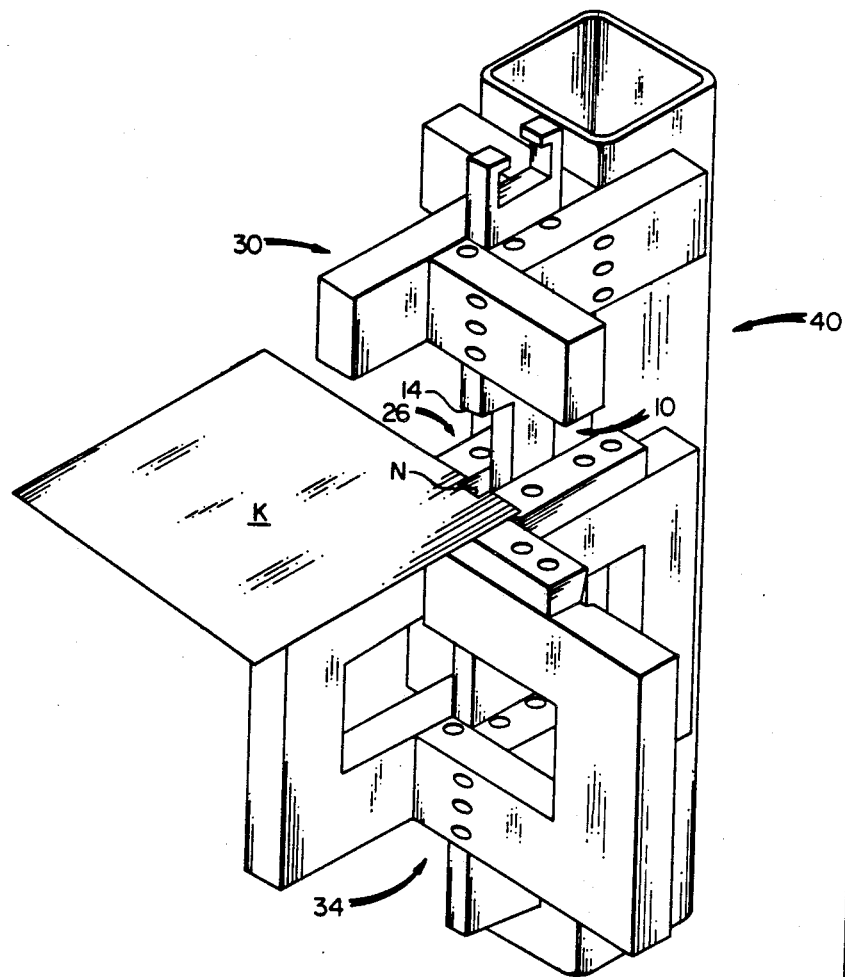
FIG. 5 is a perspective view similar to FIG. 4 but showing an exemplary work piece still in place after being notched by the punch and die.

FIG. 5 is similar to FIG. 4 in that it shows the principal components of the punch and die apparatus just described, but also shows a rectangular work piece K still in its work position after a notch N has been cut in one edge thereof.

Figure 6:
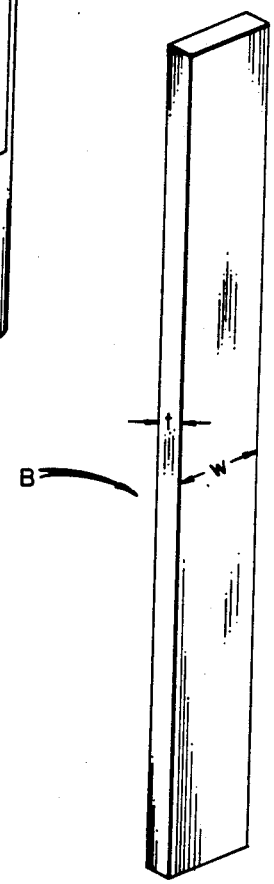
FIG. 6 is a perspective view of a set-up bar useful in correctly sizing and aligning the bearings and die shown in FIGS. 3–5.

FIG. 6 illustrates a set-up bar B that is used in setting up the described apparatus to achieve the required sizing and alignment of its pneumostatic bearings and die. As may be seen from a comparison of FIGS. 1 and 6, bar B is similar to punch 10 without cut-out section 12 and lugs 24. Bar B is made slightly wider and thicker than punch 10 in order to achieve the clearances needed between the punch and the bearings and die. In setting up the apparatus, bar B is positioned in the bearing and die openings, and the adjustably mounted bearing and die segments are then set in contact with the opposing surfaces on the bar. The mounting screws for those segments are then tightened, and the bar is removed. In this manner, the bearings and die are precisely aligned with one another, and they are sized to provide the working clearances needed between them and the punch. The punch is then inserted through the bearing and die openings and operatively coupled to the aforementioned pneumatic cylinder P.

Figure 7:
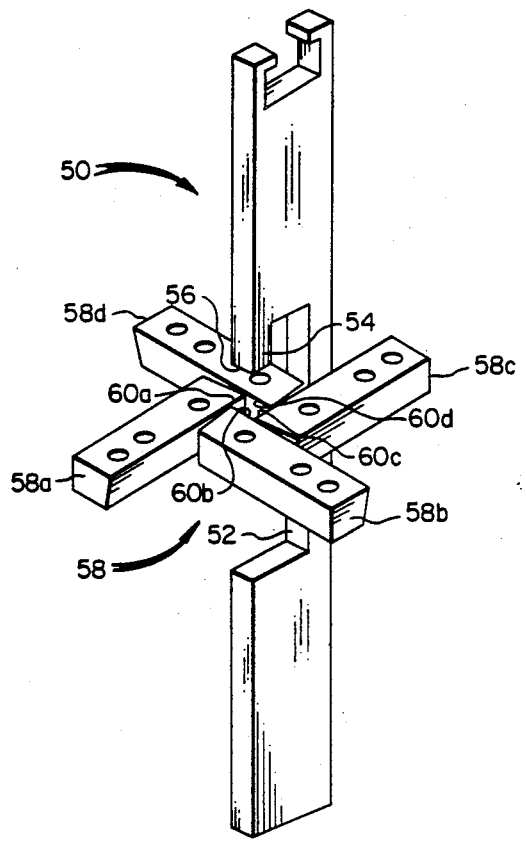
FIGS. 7–10 are perspective views illustrating alternative embodiments of the present invention.

FIG. 7 illustrates an alternative embodiment of the present invention. Shown in this figure is a punch 50 which is similar to punch 10 but differs therefrom in that cut-out section 52 of punch 50 is configured to provide a rectangular punch finger 54 having four orthogonal cutting edges 56. Adjustably mounted for alignment with punch finger 54 is a segmented die 58 comprising four die segments 58a, 58b, 58c, and 58d. Those segments have cutting edges 60a, 60b, 60c, and 60d which coact with punch finger cutting edges 56 to cut a rectangular aperture. Punch 50 is provided with pneumostatic bearing surfaces above and below die 58 for cooperation with pneumostatic bearings similar to those described above.

Figure 8:
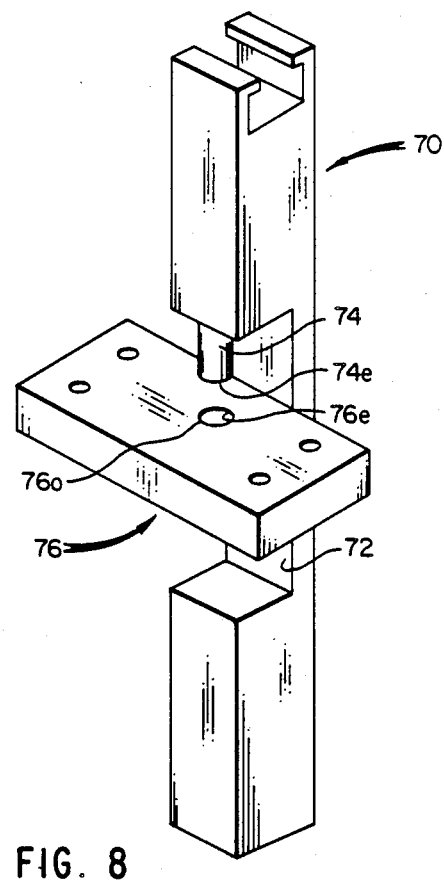

FIG. 8 depicts another embodiment of this invention wherein punch 70 has, within its cut-out section 72, a depending cylindrical punch finger 74 with a circular cutting edge 74e. For convenience, finger 74 may be made removable from the punch. In this embodiment, the cooperating die 76 is a non-segmented, one-piece die provided with a cylindrical die opening 76o having a circular cutting edge 76e that coacts with punch finger cutting edge 74e to cut a circular aperture. Here too, the punch is constrained and guided by pneumostatic bearings disposed above and below the die.

Figure 9:
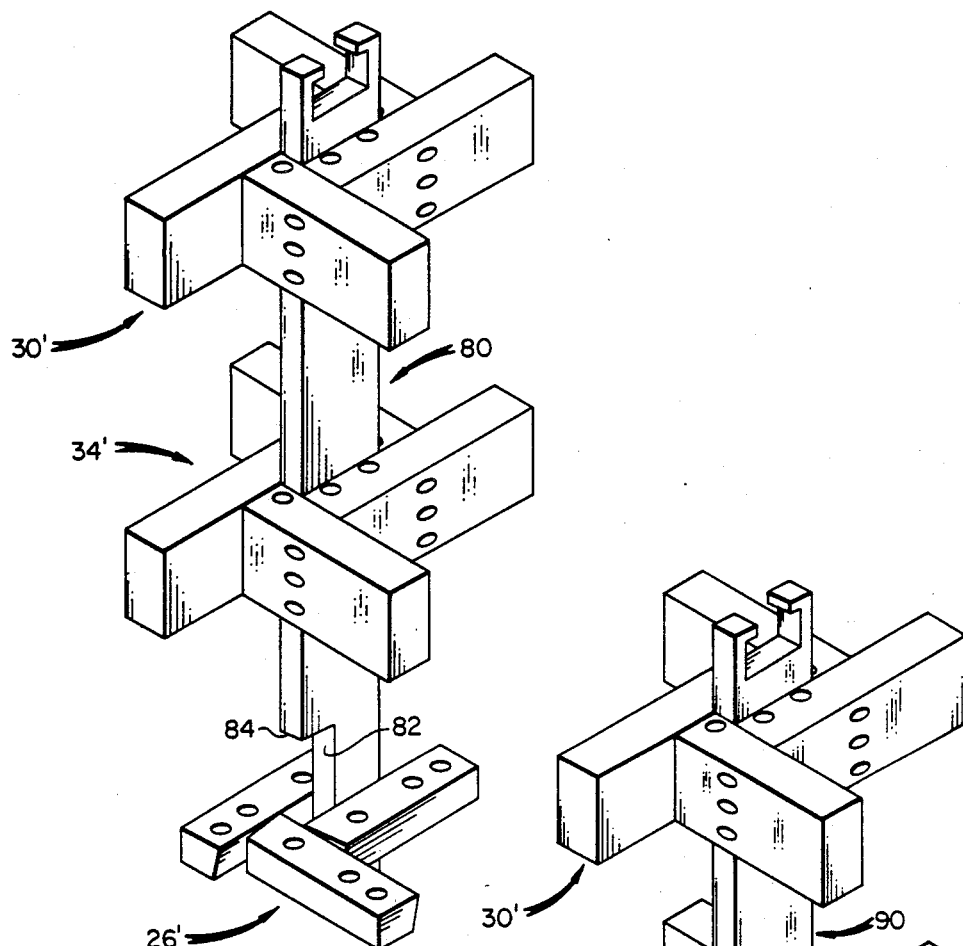

FIG. 9 illustrates still another embodiment, which is similar to that shown in FIG. 3 but differs therefrom in that die 26' in FIG. 9 is disposed below both pneumostatic bearings 30' and 34'. In this embodiment, punch 80 has its cut-out portion 82 and cutting edge 84 located at the bottom end of the punch to cooperate with the die 26' below lower bearing 34'.

Figure 10:
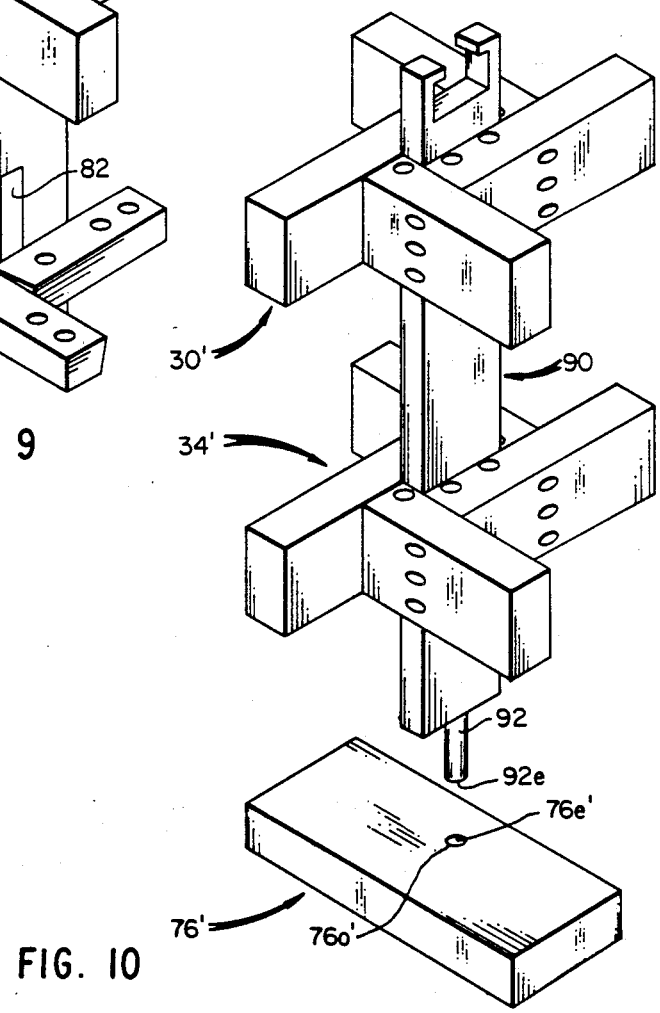

FIG. 10 depicts yet another embodiment, which is similar to that shown in FIG. 9 but differs therefrom in that punch 90 in FIG. 10 has, depending from its bottom end, a cylindrical punch finger 92 with a circular cutting edge 92e disposed above a cooperating one-piece die 76' having a cylindrical die opening 76o' and circular cutting edge 76e'. As in the FIG. 8 embodiment, finger 92 may be removable from punch 90 for convenience in sharpening and replacement.

From the foregoing, it will be seen that this invention is adaptable for use in various ways to meet a variety of needs in punch and die apparatus. Such apparatus as improved by this invention has proven successful in high-volume production applications requiring extremely precise punch constraint and guidance, very little tool wear, and facile set-up and change-over capability.

The present invention has now been described in detail with particular reference to embodiments illustrated herein. It will be understood, however, that variations and modifications can be effected within the spirit and scope of this invention.

I claim:

1. A high-precision punch and die apparatus comprising:

(a) a stationary frame;

(b) a punch adapted for movement relative to said frame, said punch having integral pneumostatic bearing surfaces and at least one cutting edge;

(c) a die adjustably mounted to said frame to receive said punch therethrough, said die having at least one cutting edge adapted to coact with said at least one cutting edge on said punch;

(d) a pair of pneumostatic bearings for constraining and guiding movement of said punch through said die, each of said bearings having a segmented journal including a plurality of journal segments provided with a pneumostatic bearing surface, said journal segments being adjustably mounted, with respect to said frame, to receive said punch therebetween so that said bearing surface on each of said journal segments is in closely spaced relation to an opposing one of said bearing surfaces on said punch;

(e) means for controllably supplying a pressurized gas to said bearing surface on each of said journal segments to facilitate said constraining and guiding of said movement of said punch through said die; and (f) means for effecting said movement of said punch through said die so as to move said at least one cutting edge on said punch into coacting relation with said at least one cutting edge on said die.

2. A punch and die apparatus as claimed in claim 1 wherein said stationary frame comprises a single tubular metal structure.

3. A punch and die apparatus as claimed in claim 1 wherein said at least one cutting edge on said punch corresponds in number to said at least one cutting edge on said die.

4. A punch and die apparatus as claimed in claim 1 wherein said die is a segmented die including a plurality of die segments adjustably mounted, with respect to said frame, to receive said punch therebetween; and wherein said at least one cutting edge on said die includes a cutting edge on each of said die segments.

5. A punch and die apparatus as claimed in claim 4 wherein said punch comprises an elongate member of rectangular cross section; wherein said segmented die is U-shaped; and wherein said plurality of die segments comprises three such segments.

6. A punch and die apparatus as claimed in claim 4 wherein said punch comprises an elongate member of rectangular cross section; wherein said segmented journal of each bearing is rectangular; and wherein said plurality of segments of each journal comprises four such segments.

7. A punch and die apparatus as claimed in claim 5 wherein said die is disposed between said bearings.

8. A punch and die apparatus as claimed in claim 6 wherein said die is disposed between said bearings.

9. A punch and die apparatus as claimed in claim 1 wherein said bearings are both disposed at one side of said die.

10. A punch and die apparatus as claimed in claim 1 wherein said bearings are respectively disposed at opposite sides of said die.

11. A punch and die apparatus as claimed in claim 1 wherein said bearings and said die are vertically aligned in superposed relation, with one of said bearings above and the other below said die.

12. A punch and die apparatus as claimed in claim 1 wherein said gas is air, said pneumostatic bearings are air bearings, and said pneumostatic bearing surfaces are air bearing surfaces.

13. A punch and die apparatus as claimed in claim 1 wherein said movement effecting means includes a pneumatic cylinder operatively coupled to said punch.

* * * * *